(12) United States Patent
Brovelli et al.

(10) Patent No.: US 12,461,255 B2
(45) Date of Patent: Nov. 4, 2025

(54) MULTI-COMPONENT COMPOSITE SCINTILLATOR FOR DETECTION OF IONISING RADIATION AND NEUTRONS

(71) Applicants: UNIVERSITA' DEGLI STUDI DI MILANO—BICOCCA, Milan (IT); GLASS TO POWER S.P.A., Rovereto (IT)

(72) Inventors: Sergio Brovelli, Milan (IT); Mauro Fasoli, Milan (IT); Luca Gironi, Milan (IT); Marina Gandini, Milan (IT); Anna Vedda, Milan (IT)

(73) Assignees: UNIVERSITA' DEGLI STUDI DI MILANO—BICOCCA, Milan (IT); GLASS TO POWER S.P.A., Rovereto (IT)

( * ) Notice: Subject to any disclaimer, the term of this patent is extended or adjusted under 35 U.S.C. 154(b) by 792 days.

(21) Appl. No.: 17/755,648

(22) PCT Filed: Nov. 3, 2020

(86) PCT No.: PCT/IB2020/060312
§ 371 (c)(1),
(2) Date: May 4, 2022

(87) PCT Pub. No.: WO2021/090167
PCT Pub. Date: May 14, 2021

(65) Prior Publication Data
US 2022/0390627 A1    Dec. 8, 2022

(30) Foreign Application Priority Data
Nov. 8, 2019    (IT) .................... 102019000020618

(51) Int. Cl.
*C09K 11/06*    (2006.01)
*C09K 11/02*    (2006.01)
(Continued)

(52) U.S. Cl.
CPC ............ *G01T 1/2023* (2013.01); *C09K 11/02* (2013.01); *C09K 11/06* (2013.01); *C09K 11/665* (2013.01); *B82Y 20/00* (2013.01)

(58) Field of Classification Search
CPC ......... C09K 11/02; C09K 11/06; C09K 11/08; C09K 11/665; G01T 1/2023; G01T 1/2033; G21K 4/00
See application file for complete search history.

(56) References Cited

U.S. PATENT DOCUMENTS 7,582,880 B2    9/2009    Wallace et al.
2018/0286923 A1*  10/2018    Fischer ................. H10K 85/50

FOREIGN PATENT DOCUMENTS

CN    109851510 A    6/2019
WO    2019053567 A1    3/2019

OTHER PUBLICATIONS

International Search Report and Written Opinion for Corresponding International Application No. PCT/IB2020/060312, 9 pages, Mar. 19, 2021.

* cited by examiner

*Primary Examiner* — Matthew E. Hoban
*Assistant Examiner* — Lynne Edmondson
(74) *Attorney, Agent, or Firm* — LUCAS & MERCANTI, LLP

(57) ABSTRACT

A sensitized composite scintillator which optionally interacts with ionizing radiation is provided having a vitreous or plastic matrix in which there are incorporated perovskite nanostructures which sensitize light emitters.

27 Claims, 6 Drawing Sheets

(51) Int. Cl.
*C09K 11/66* (2006.01)
*G01T 1/202* (2006.01)
*G01T 1/203* (2006.01)
*B82Y 20/00* (2011.01)

MULTI-COMPONENT COMPOSITE SCINTILLATOR FOR DETECTION OF IONISING RADIATION AND NEUTRONS

CROSS-REFERENCE TO RELATED APPLICATIONS

This application is a 371 of PCT/IB2020/060312, filed Nov. 3, 2020, which claims the benefit of Italian Patent Application No. 102019000020618, filed Nov. 8, 2019.

FIELD OF THE INVENTION

The subject of the present invention is a multi-component scintillator according to the preamble of the main claim. The subject of the invention is generally associated with the detection of radiation.

BACKGROUND OF THE INVENTION

As is known, the revelation or detection of ionising radiation or neutrons is of great importance in many technical and scientific fields which include national security, underground exploration for oil drilling, and industrial control of high-energy physics, medical diagnostics and the like.

Detection of ionising radiation can be carried out by a unit or device, known as a scintillator, which converts the energy of the radiation which strikes it into light. The energy is deposited in the scintillator by the radiation which penetrates into the system, and the light which is produced by the scintillation is revealed by an appropriate photorevealer (photodetector).

It should be noted that, in this context, the term "radiation" covers both radiation composed by high-energy particles (alpha particles, beta particles, neutrons, etc.) and by ionising photons, such as x-rays, gamma rays, etc.

Scintillators are thus devices which emit light when said radiation interacts with them.

For the use of these devices, in monitoring of goods at national frontiers, in industrial control, in the field of high-energy physics, in diagnostic medicine, and in particular therapies, the physical process of scintillation must take place efficiently, and, in many applications, rapidly.

Various types of scintillators are known, which are differentiated from one another by the type of material which constitutes them, or by the way in which they operate (response times, for example), or by their efficiency.

A particular type of scintillator is that of scintillators with inorganic crystals, which are used in particular to detect penetrating ionising radiation, or that of scintillators with organic crystals.

Composite scintillators, which are typically made of plastic material (hereinafter also known as nanocomposite scintillators) represent a very attractive alternative to the equivalent scintillators or inorganic crystals, in particular because of their versatility of production and lightness, and because they can be produced with different dimensions and forms, with characteristics which can be adapted to the specific applications.

Typically, these devices are constituted by plastic or polymer or vitreous matrices, containing or covered by scintillator material such as organic material or polymers. The ionising radiation interacts with the scintillator material by means of processes which depend on the nature of the particles (for example by means of Coulomb impacts, Compton scattering, photoelectric effect, creation of torque, etc.), resulting in the generation of luminescence which is propagated and is subsequently detected by highly efficient photodiodes or photomultipliers.

Nanocomposite scintillators are particularly important for applications where it is necessary to produce devices with an extensive surface area which can detect radioactive material, such as the monitoring of goods at national borders, in particular in containers and large transport vehicles. In these contexts, thanks to their versatility of production and their low weight, nanocomposite scintillators can be used more easily than the more common scintillators with crystals.

Other scintillators, or rapid scintillators (with a scintillation time of approximately a few nanoseconds or less), which are typically defined by thin films which are also coupled to solid crystalline structures, are used in radiometric applications which are based on the principle of Time of Flight (TOF). These include medical imaging techniques such as positron emission tomography (TOF-PET), where the time of response to the event of interaction with the ionising radiation is critical for reconstruction of high-quality, precision images. Likewise, rapid scintillators are critical in contexts such as high-energy physics, in particular in high-luminosity particle accelerators, where it is necessary to avoid processes of pile-up of the signal, and to locate the events with precision.

In all these contexts, the key characteristics of the scintillator devices are:

High probability of interaction with the ionising radiation and/or with neutrons. For the ionising radiations, this characteristic depends on the actual atomic number (Z) of the scintillator material, according to a power law (proportional to $Z^n$, with n which varies between 1 and 5 depending on the specific type of interaction), from which the need to include atoms of heavy elements in the scintillator materials is deduced. For the case of neutrons, the presence of specific ions with which the neutrons can interact is necessary, such as, for example, Li, Gd, B for the thermal neutrons, and H for the rapid neutrons.

The absence of reabsorption of light by the scintillator device itself. For the purpose of obtaining production of scintillator devices with a large surface area, a large volume, and optionally a high load of emitters, a key role is played by the optical properties of absorption and photoluminescence of the materials which constitute the scintillator, in particular that of the nanocomposite type. In fact, once the scintillation light has been generated, it is crucial for its detection that the light can be propagated inside the scintillator without being absorbed once more by the various components of the system.

Rapid scintillation, which is necessary for applications in which the timing of the scintillation process is a fundamental part of the information to be gathered. This time should be of an order of magnitude of a few nanoseconds or less.

High efficiency of scintillation, known as light yield (LY), which defines the number of photons emitted by a scintillator device per unit of ionising radiation energy absorbed.

Nanocomposite scintillators based on organic molecules have low efficiency of scintillation because of the fact that the atomic number Z of the constituent elements and organic molecules (defining the oscillator material) is typically small. In order to eliminate this limit, solutions are known which, inter alia, include the insertion of a component, known as the high Z sensitiser (HZS), inside the nanocomposite scintillator.

An HZS is typically constituted by a material which includes in its composition heavy atoms ("with a high Z"), such as, for example, lead, bismuth and ions of rare earths such as lutecium and gadolinium. The purpose of the HZS is to increase the probability of interaction with the radiation of the nanocomposite scintillator, and to sensitise the emission of light of a second element, known as the emitter (indicated as E hereinafter) by means of secondary processes including transfer of energy, transfer of load, emission of photons and/or electrons and so on. The nanocomposite scintillators or plastics which are based on this approach are known as sensitised composite scintillators (SCS).

SUMMARY OF THE INVENTION

The objective of the present invention is to provide an SCS which is improved compared with the known solutions and with those already disclosed at the level of scientific publication, but still in the design stage, which SCS makes it possible to obtain all the key characteristics of a scintillator previously illustrated in a single composite solution.

In particular, an objective of the present invention is to provide an SCS which can have high-level efficiency, i.e. an SCS which has high probability of interaction with ionising radiation or with neutrons.

A further objective of the invention is to provide an SCS which has minimum losses from reabsorption.

A further objective of the invention is to provide an SCS which has a rapid scintillation time, i.e. less than 5 nanoseconds.

A further objective of the invention is to provide multi-component systems in which suitably engineered SCSs are combined with one another and/or with other scintillator devices, such as, for example, inorganic scintillator crystals, in order to obtain improved performance levels and/or to permit simultaneous detection of different ionising radiations (e.g. x-rays, alpha particles) and non-ionising radiations (for example neutrons).

These objectives and others, which will become apparent to persons skilled in the art, are achieved by an SCS according to the appended claims.

BRIEF DESCRIPTION OF THE DRAWINGS

For better understanding of the present invention, and purely by way of non-limiting example, the following drawings are appended, in which.

DETAILED DESCRIPTION OF THE INVENTION

The invention is a scintillator of the SCS type in which an HZS component based on perovskite nanostructures is used, such as, for example, nanocrystals, nanocubes, nanothreads, nanoleaves of halides of lead or another metal, or other systems with a heavy weight which can easily interact with the ionising radiation or with neutrons. These nanostructures can be present both individually and coupled to other materials, such as, for example, molecules, nanoparticles or clusters of metals.

The optical properties of the HZS can be regulated by controlling the dimension and form of the nanocrystals and their composition, which can easily be varied by means of post-synthesis treatments; this makes it possible to obtain emission spectrums which are variable as required, ranging from UV to the near infrared.

In addition, these materials have high tolerance to structural defects, which properties guarantee high levels of efficiency of emission, and resistance to irradiation with ionising and non-ionising radiation.

The compositional flexibility of these systems also makes it possible to create nanostructures containing elements which can interact selectively with specific types of directly- and non-directly ionising radiation, for example lithium, gadolinium or boron for the neutrons. This makes it possible to combine SCSs with complementary selectivity, in order to distinguish between different types of radiation simultaneously, for example by means of the wavelength of the scintillation light. These systems can also be produced by means of synthesis on a large scale, carried out at ambient temperature with methods which are not exacting.

With these HZSs there are coupled emitters E (hereinafter indicated solely by the letter E) with optical properties which are selected such as to maximise the sensitisation by the HZS further to interaction with radiation, and to ensure emission which is rapid and not affected by reabsorption. In particular, the spectrum of absorption of light of E can be selected such as to obtain the maximum superimposition with the scintillation spectrum of the corresponding HZS.

In addition, the spectrum of luminescence of E must show spectral separation (indicated by the term "Stokes shift") relative to the respective optical absorption such as to minimise the reabsorption.

Finally, E is engineered so as to obtain a rapid luminescence time.

Amongst the examples of materials suitable as E, these can be organic, inorganic or hybrid luminescent molecules, clusters of metals, nanocrystals with a semiconductor or oxides or another emitter with a high level of Stokes shift which makes it possible to minimise the phenomenon of reabsorption of the guided light, and accelerate the scintillation time of the HZS.

Figure 1:
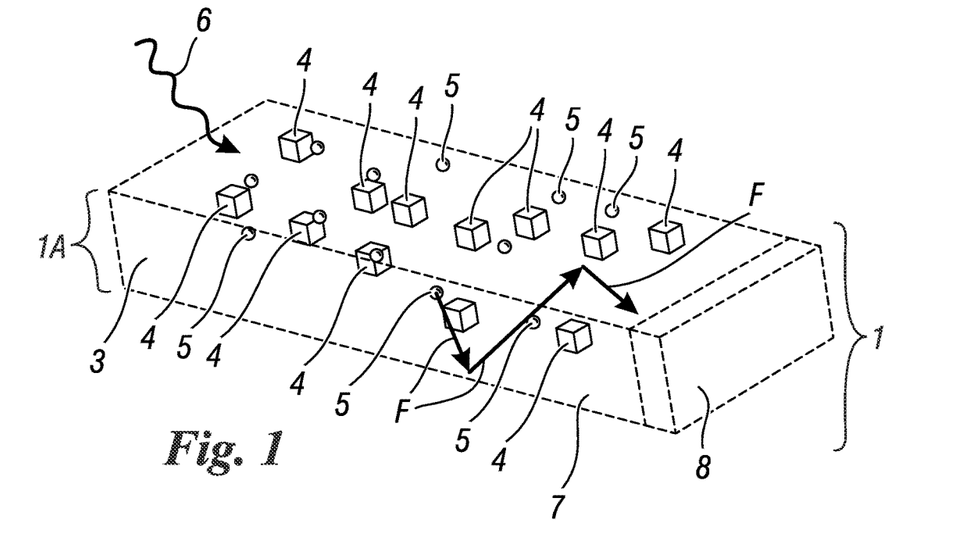
FIG. 1 shows a schematic representation of an SCS which consists of a matrix containing HZSs (represented as cubes) and a second species E (represented as spheres)

With reference to the figures cited, a sensitised composite scintillator or SCS is generally indicated as 1, and comprises a body 1A made of plastic material or polymer material (for example PMMA, PVT) or vitreous material, in which there are incorporated HZS nanocrystals, which, purely by way of description, are shown as cubes which can clearly be identified within the body 1 of the SCS; these HZS nanocrystals are indicated as 4.

Likewise, in the body 1A, there are incorporated emitters E, which, purely by way of description, are shown as spheres which can clearly be identified within the body 3 of the SCS, and are indicated as 5.

Further to exposure to ionising radiation or neutrons (indicated in the figures by number 6 in FIGS. 1 and 2), the "system" comprising the HZS and E can produce light radiation 7 efficiently, which is guided by the body 1A, as shown by the arrows F in FIG. 1. At edges of the body 1A, there are present high-efficiency detectors, indicated as 8 (only one of them is shown in FIG. 1), which can collect the guided light radiation and convert it into electricity.

The body 1A of the SCS 1 comprises a "matrix" 3, which can be obtained from different materials. By way of non-limiting example, these can be: polyacrylates and polymethylmethacrylates, polyolefins, polyvinyls, epoxide resins, polycarbonates, polyacetates, polyamides, polyurethanes, polyketones, polyesters, polycyanoacrylates, silicones, polyglycols, polyimides, fluorinated polymers, polycellulose and derivatives such as methylcellulose, hydroxymethylcellulose, polyoxazine, glasses or silica bases. The matrix 3 itself of the SCS can be obtained from copolymers of the aforementioned polymers.

Figure 8A:
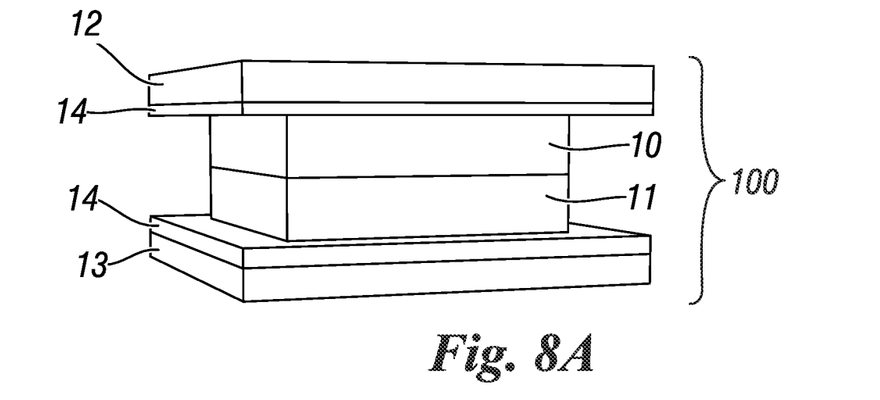
FIGS. 8a, 8b, and 8c show three possible embodiments of multi-component devices for selective simultaneous detection of different types of radiation such as, for example, alpha particles, gamma particles or neutrons.
Figure 8B:
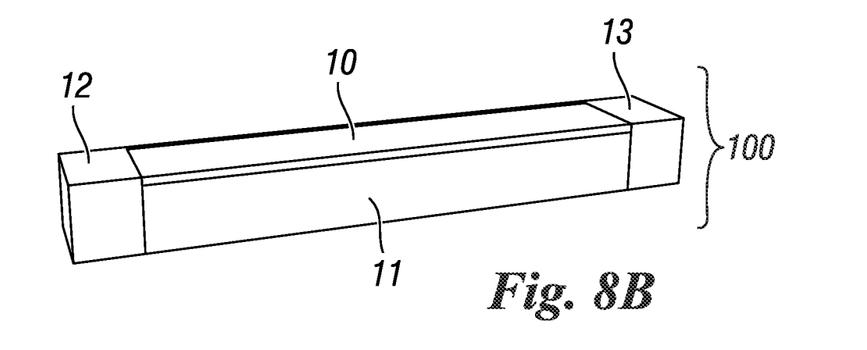

FIGS. 8a and 8b represent examples of two possible embodiments of multi-component devices for selective simultaneous detection of different types of radiation, for example alpha particles, gamma particles or neutrons. In a first case, which is given by way of non-limiting example, the multi-component device (indicated as 100) comprises at least two SCSs (10 and 11) in a coupled configuration. This is obtained for example by depositing a layer of a first SCS on the surfaces of the second one, such as to obtain a single solid material with variable composition, or by coupling two SCSs optically by means of appropriate optical greases or adhesives.

In FIG. 8a, the multi-component device 100 has the two SCSs 10 and 11 interposed between optical filters 14 and end detectors 12 and 13 which close the device at the top and bottom; in FIG. 8b, the device 100 again comprises two superimposed SCSs 10 and 11, but the detectors 12 and 13 are placed laterally relative to the SCSs.

The various components of the devices are coupled stably to one another in any known manner, for example using transparent optical grease or another adhesive which assists the optical contact, optionally reducing the refractive index jump (if it is present) or using one SCS as a substrate for depositing or production of the second one.

Figure 8C:
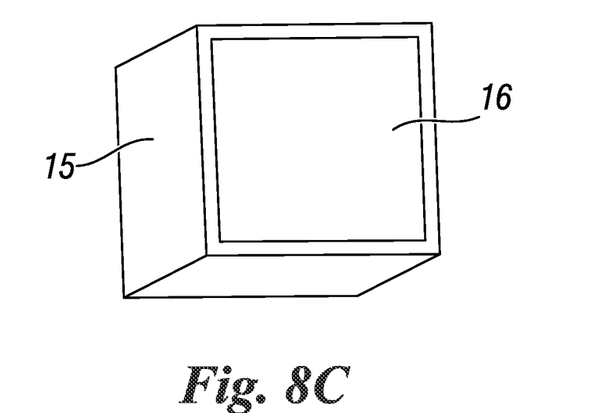

In the devices 100 in FIGS. 8a, 8b and 8c, the different SCSs are engineered such as to generate scintillation light with a specific wavelength further to interaction with different radiations (which are and are not directly ionising). For example, the SCS 10 based on HZSs and Es optimised for the detection of alpha particles, by means of wavelength emission $\lambda 1$, is combined with the SCS 11 based on selective elements for the detection of neutrons (for example Li, B, Gd, etc.) by means of emission of scintillation light with a wavelength $\lambda 2$, and $\lambda 1$ is different from $\lambda 2$.

Since each device 100 comprises SCSs 10 and 11 which are coupled optically with (at least) two high-efficiency detectors appropriately selected for the detection of $\lambda 1$ (12) and $\lambda 2$ (13), it is possible to distinguish the two types of radiation simultaneously by means of spectral selection of the scintillation light.

As shown in FIG. 8a, between the SCSs 10 and 11 and the respective detectors 12 and 13, it is possible for there to be present the optical filters 14 which maximise the efficiency of the entire device 100, and guarantee the specific detection of the two scintillation lights with a wavelength different from that of the respective detector. Alternatively, as shown by way of non-limiting example in FIG. 8b, the multi-component device 100 is composed only of the at least two SCSs 14 and 15 in a multi-layer configuration without the filters 14. In this case, the two SCSs can detect autonomously the (ionising and non-ionising) incident radiation according to the penetration power thereof. For example, radiation composed of alpha particles and gamma rays is distinguished since the alpha particles are absorbed in the SCS 10, with the penetration power of the alpha particles typically being much lower than that of the gamma radiations. The interaction with the SCS 10 gives rise to emission of a wavelength $\lambda 1$. The gamma rays having a penetration power greater than the alpha particles pass through the SCS 10, giving rise to virtually negligible interaction because of the small thickness thereof, and interact mainly with the SCS 11, giving rise to emission with a wavelength $\lambda 2$, which is different from $\lambda 1$.

The multi-layer device is thus coupled to at least the two high-efficiency detectors appropriately selected for detection of $\lambda 1$ (16) and $\lambda 2$ (17), such as to distinguish the two types of radiation simultaneously, by means of spectral selection of the scintillation light and by means of appropriate electronics operating in anti-coincidence which reject any "false positive" signals caused by the interaction of both the SCSs with the same radiation.

The selectivity of these multi-component SCS devices for simultaneous distinguishing of different radiations can thus be optimised, not only by means of suitable selection of the HZS and E pairs in the respective SCSs, but also by means of the geometry of the composite device. This geometry can for example comprise a configuration in the form of a core/shell, as shown by way of example in FIG. 8c for the case of composite SCSs with a cubic form, in which a solid core 16 is engineered in terms of both dimensions and composition to interact with penetrating radiation (for example x-rays or gamma rays) whereas the thin outer shell 15 has the task of interacting with radiation and low penetration power (for example alpha particles). It should be noted that the three-dimensional configuration in the form of a core/shell makes it possible to detect simultaneously different radiations coming from every direction.

Said multi-component scintillator devices can also be constituted by different materials such as hetero-structured materials.

According to a fundamental characteristic of the present invention, the nanocrystals which are used as HZSs in the SCS described are, purely by way of non-limiting example, nanocrystals of the perovskite type, with general compositions of the type such as:

A) $M^1M^2X_3$, which can or need not be doped with heteroatoms, wherein:

$M^1$=Cs or other elements of the group 1A or 1 in the IUPAC nomenclature;

$M^2$=Pb, Sn or other elements in the group IV or 14 in the IUPAC nomenclature;
X=element of the group $VII_A$ or 17 in the IUPAC nomenclature;
B) $RMX_3$, which can or need not be doped with heteroatoms, wherein:
R=$[CH_3NH_3]^+$, $[CH(NH_2)_2]^+$, $[CH_6N_3]^+$ or other variously constituted organic molecules;
M=Pb, Sn or other elements of the group IV or 14 in the IUPAC nomenclature;
X=element of the group VIIA or 17 in the IUPAC nomenclature;
C) $M^1_2M^2X_6$, which can or need not be doped with heteroatoms, wherein:
$M^1$=Cs or other elements of the group 1A or 1 in the IUPAC nomenclature;
$M^2$=element of the group IV or 14 in the IUPAC nomenclature;
X=element of the group $VII_A$ or 17 in the IUPAC nomenclature;
D) $M^1_3M^2_2X_9$ or $R_3M^2_2X_9$, which can or need not be doped with heteroatoms, wherein:
$M^1$=Cs or other elements of the group 1A or 1 in the IUPAC nomenclature;
R=$[CH_3NH_3]^+$, $[CH(NH_2)_2]^+$, $[CH_6N_3]^+$ or other variously constituted organic molecules;
$M_2$=Bi or another element of the group $V_A$ or 15 in the IUPAC nomenclature;
X=element of the group VIIA or 17 in the IUPAC nomenclature;
E) Double perovskites with the general composition $M^1_2M^2M^3X_6$, wherein
M1=element of the group IA or 1 in the IUPAC nomenclature;
$M^2$=elements of the group IB or 11 in the IUPAC nomenclature or of the group IIIA or 13 in the IUPAC nomenclature;
$M^3$=element of the group $V_A$ or 15 in the IUPAC nomenclature;
X=element of the group $VII_A$ or 17 in the IUPAC nomenclature.
These perovskites are for example: $Cs_2CuSbCl_6$, $Cs_2CuSbBr_6$, $Cs_2CuBiBr_6$, $Cs_2AgSbBr_6$, $Cs_2AgSbI_6$, $Cs_2AgBiI_6$, $Cs_2AuSbCl_6$, $Cs_2AuBiCl_6$, $Cs_2AuBiBr_6$, $Cs_2InSbCl_6$, $Cs_2InBiCl_6$, $Cs_2TlSbBr_6$, $Cs_2TlSbI_6$, and $Cs_2TlBiBr_6$. These composites can or need not be doped with heteroatoms.
F) Further possible compositions with double perovskite with the general composition $M^1_2M^2M^3X_{6'}$, which can or need not be doped with heteroatoms wherein:
$M^1$=element of the group IA or 1 in the IUPAC nomenclature;
$M^2$=monovalent cations of elements or chemical species;
$M^3$=trivalent cations of elements or chemical species;
X=element of the group VIIA or 17 in the IUPAC nomenclature. These composites can or need not be doped with heteroatoms.
G) $M^1M^3X6$, wherein:
$M^1$=element of the group IA or 1 in the IUPAC nomenclature;
$M^3$=trivalent cations of elements or chemical species which are balanced by the presence of ionic vacancies;
X=element of the group VIIA or 17 in the IUPAC nomenclature. These composites can or need not be doped with heteroatoms.
H) Perovskites based on chalcogens with the formula $ABX_3$ wherein:
A=divalent cation of elements or chemical species;
B=trivalent cation of elements or chemical species; and
X=ion of chalcogen such as, for example, Se, S, Te, O. These composites can or need not be doped with heteroatoms.
I) $A_2M^3M^5X_6$, wherein:
A=divalent cation of elements or chemical species;
$M^3$=trivalent cation of elements or chemical species;
$M^5$=pentavalent cation of elements or chemical species; and
X=ion of chalcogen. These composites can or need not be doped with heteroatoms.
L) $M^1_2M^2X_4$, wherein:
$M^1$=Cs or other elements of the group 1A or 1 in the IUPAC nomenclature;
$M^2$=divalent cation of elements or other chemical species;
X=element of the group $VII_A$ or 17 in the IUPAC nomenclature. These composites can or need not be doped with heteroatoms;
M) $AM_2M^2X_4$, which can or need not be doped with heteroatoms, wherein:
A=monovalent cation of elements or chemical species of the group 1 in the IUPAC nomenclature;
M=monovalent cation of elements or chemical species of the group 1 in the IUPAC nomenclature different from A;
$M^2$=pentavalent cation of elements or chemical species; and
X=ion of an element of the group VI or 16 in the IUPAC nomenclature.

Again according to a fundamental characteristic of the present invention, the materials used as HZSs in the SCS described are, purely by way of non-limiting example, perovskite nanocrystals coupled to other nanostructures such as molecules, nanoparticles, or luminescent metal clusters of elements such as, for example, gold, silver, nickel, platinum, palladium, copper, aluminium, iron and corresponding alloys.

The perovskite nanocrystals 4 are alternatively in the form of nanocubes, nanospheres, nanothreads and nanoleaves. The dimensions are between 1 nm and 100 nm. These crystals constitute from 0.0001% to 95% by weight of the body 1a of the scintillator.

The emitters E 5 are nanoparticles of semiconductors, alternatively:
of the group II-VI such as CdSe, CdS, ZnS, ZnSe, CdTe, HgTe, ZnTe, ZnO,
of the group III-V such as InP, GaN, InSb, AlN,
of the group IV such as Si, Ge, of the group IV-VI PbS, PbSe, of the group I-III-VI such as $CuInS_2$, $CuInSe_2$, CuInSSe, $CuInZnS_2$,
doped and not doped with heteroatoms and respective alloys and heterostructures.

Alternatively, the emitters E 5 are clusters of metals comprising gold, silver, nickel, platinum, palladium, copper, aluminium, iron and corresponding alloys.

These emitters E 5 can also be nanoparticles of inorganic and hybrid organic-inorganic perovskites, conjugated polymers or conjugated organic molecules, they can be supramolecular assemblies of organic or inorganic molecules, or they can be organometallic complexes.

In the case shown in FIGS. 1-6 by way of example, consideration is given specifically to $CsPbBr_3$ as a HZS and a derivative of perilene as E. The key characteristics of the embodiment of the present example are: i) the composition based on heavy elements (Pb) of the HZS composite ($CsPbBr_3$) which guarantees a high level of interaction with ionising and non-ionising radiation; ii) the high quantic performance of scintillation of the HZS; iii) the almost complete resonance between the luminescence of the HZS (curve G in FIG. 3) and the absorption spectrum of E (curve K in FIG. 3) which guarantee complete sensitisation thereof. The absorption spectrum of the HZS is indicated as M; iv) the high quantic performance of luminescence of E; v) its high level of Stokes shift, which minimises the spectral superimposition between the luminescence (curve L) and the optical absorption of E, thus guaranteeing minimum losses through self-absorption; and vi) the short life of E (less than 5 ns, shown by the curve H in FIG. 4) obtained by subjecting the scintillator to radiation with a wavelength λ of 400 mm, and wherein the matrix 3 is made of PMMA, thus making the system suitable for applications in TOF mode.

Figure 2:
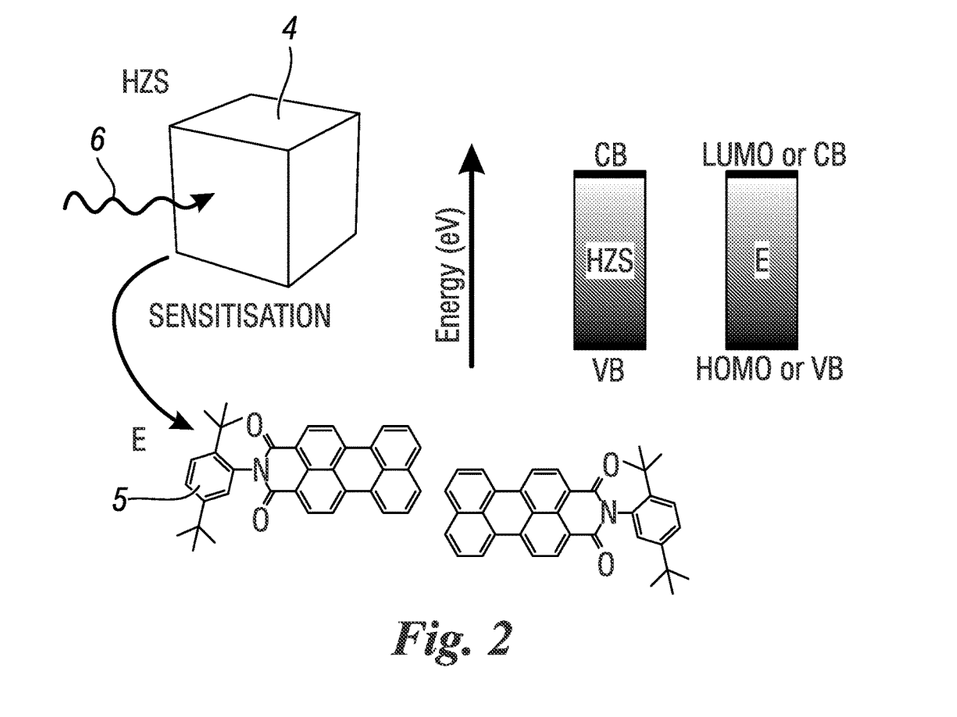
FIG. 2 shows by way of example the representative diagram of the process of sensitisation of the second species E based on an organic dye (perylene dyad) by perovskite nanocubes ($CsPbBr_3$)
Figure 3:
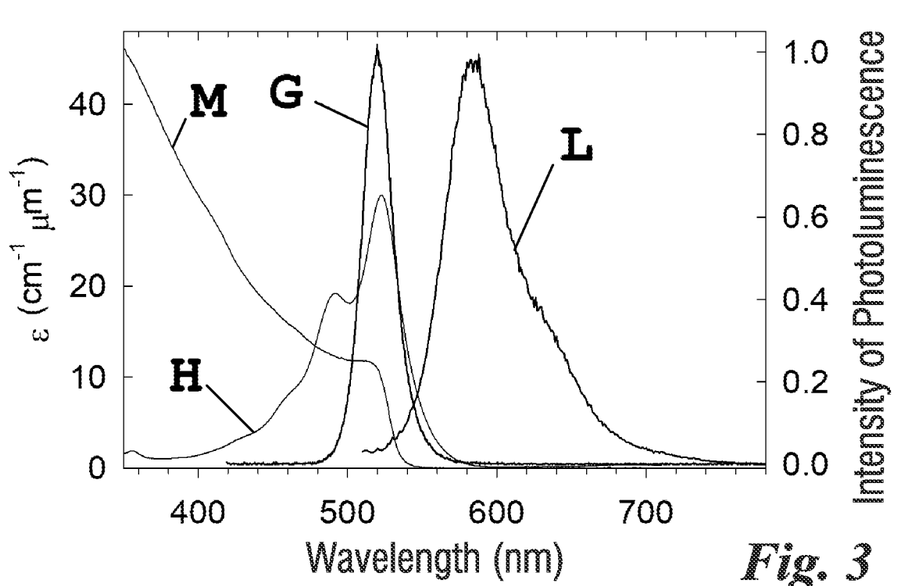
FIG. 3 shows by way of example the spectrums of optical absorption and photoluminescence of the two composites cited in relation with FIG. 3.
Figure 4:
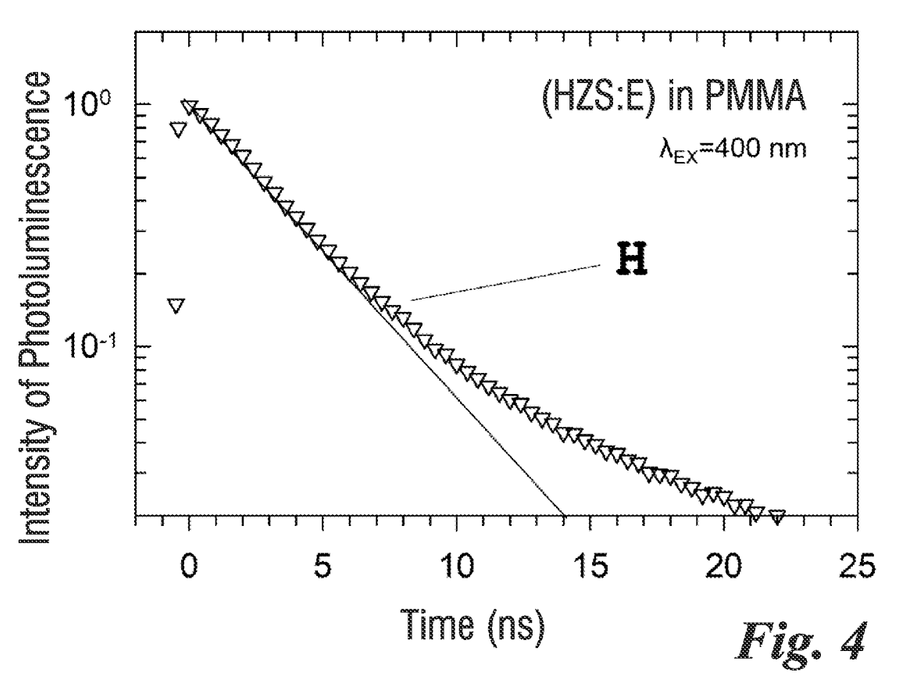
FIG. 4 shows a graph showing the time-based development of the photoluminescence of the composite E sensitised by the HZS as shown in FIG. 2 in an SCS according to the invention.

As also shown in FIG. 2 on the right, E has a band diagram where the levels of the frontier orbitals HOMO and LUMO are perfectly isoenergetic relative to the valence and to the conduction bands of the HZS composite. This is relevant for preventing a separation of load between the two species (HZS and E), resulting in slowing down of the indirect decay of the excitons, or losses of efficiency by fractionisation of the excitons.

According to an embodiment of the invention, an HZS was produced and tested (FIG. 1) constituted by a polyacrylate matrix (in particular made of PMMA) which incorporates the perovskite nanocubes or nanocrystals 4 of the aforementioned type as the HZS, and a perilene derivative as E (spheres 5).

It should be noted that the PMMA matrix was selected for its high optical quality, for the low coefficient of absorption in the entire visible spectrum (with consequent minimum losses through absorption by the matrix 3 of the scintillator, including for large-sized devices), and for its good resistance to radiations.

The two species (HZS and E) were added to the PMMA dissolved in dichloromethane, and mixed finely by means of vigorous mixing. In order to reinforce the interaction with the ionising radiation, the nanocomposites were produced with 2% by weight of nanocrystals (HZS) and with a quantity of E regulated in order to maximise the overall efficiency of sensitisation. The solutions obtained were dried in conditions of controlled temperature and atmosphere, in order to control the kinetics of evaporation of the solvent, and avoid the formation of bubbles and cracks in the matrix, and prevent precipitation of the nanocrystals and segregation of the E phase, which could lead to the formation of non-emissive molecular aggregates.

The position of these systems (HZS and E) inside the nanocomposite, and their orientation, can be controlled, with a level ranging from 0% to 100%. According to an embodiment of the invention, these materials (HZS and E) are dispersed randomly in the nanocomposite, i.e. the level of orientation is equal to 0%.

A comparison between the spectroscopic measurements of the two systems (HZS and E) in a toluene solution, and in the case in which they are incorporated in the polymer waveguide (matrix 3) indicates that their optical properties are completely preserved after the production process, further demonstrating the suitability of the materials proposed in nanocomposites made of plastic material.

Figure 5:
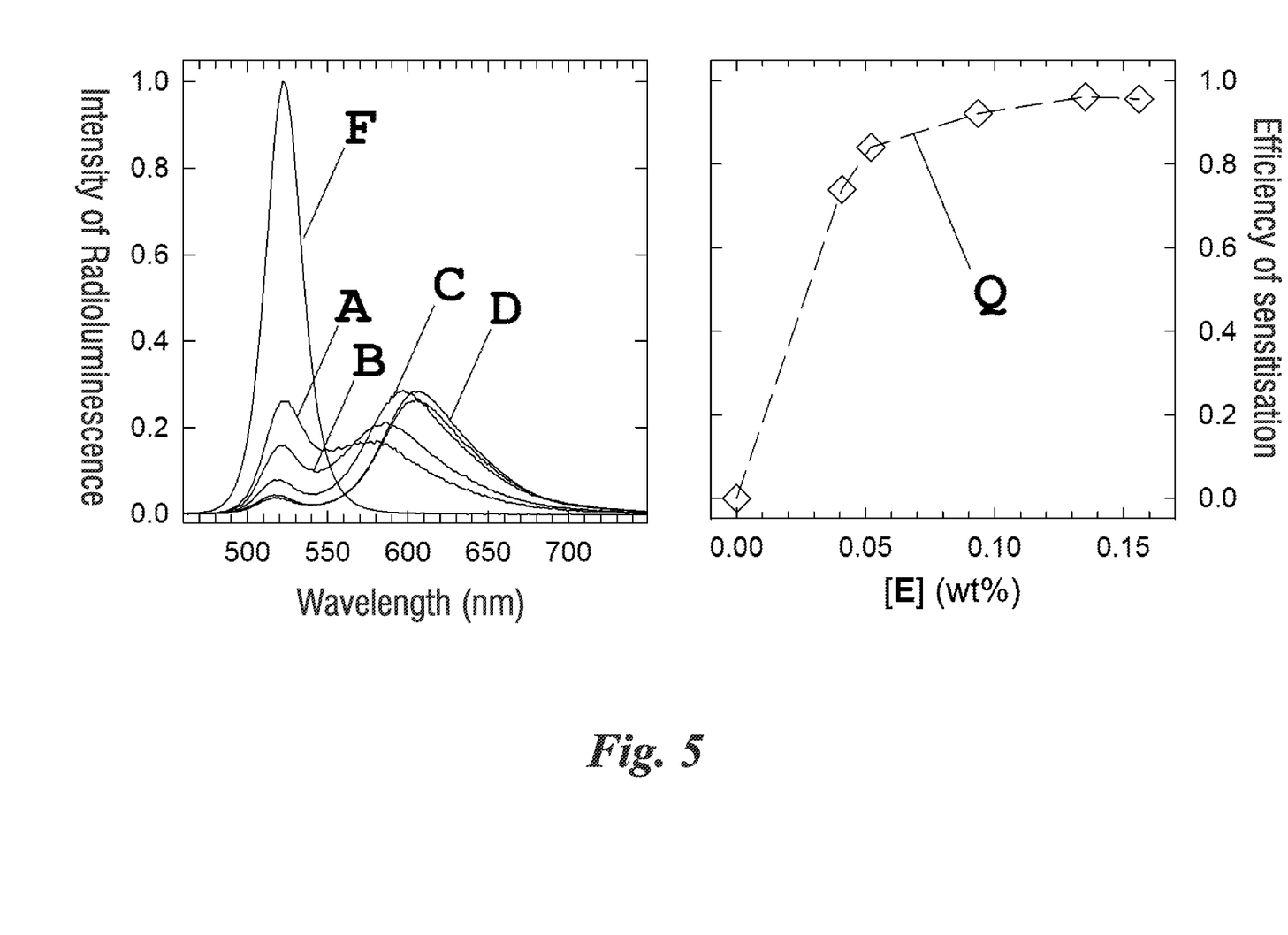
FIG. 5 shows the radioluminescence spectrums obtained in SCSs containing different relative quantities of the above-described HZS and E pair, such as to maximise the process of scintillation sensitised according to the embodiment of the invention.
Figure 6:
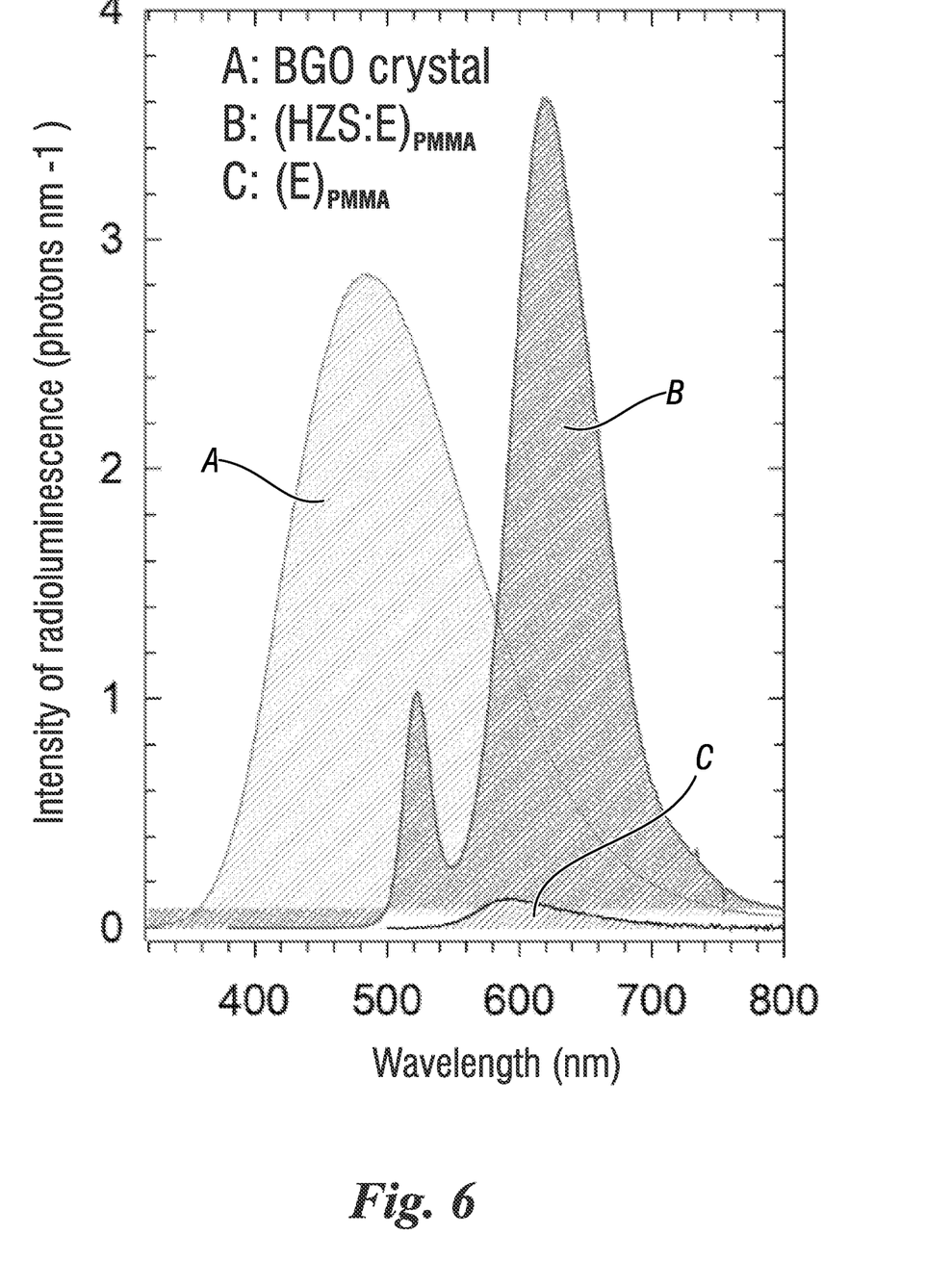
FIG. 6 shows the spectrums of radioluminescence of nanocomposites used in an SCS according to the invention compared with a conventional scintillator crystal based on bismuth germanate ($Bi_4Ge_3O_{12}$)

FIG. 5 shows on the left the different intensities of radioluminescence according to the wavelength of the nanocomposites of PMMA, with a percentage of 2% by weight of HZS nanocrystals (curve F) compared with PMMA nanocomposites comprising also different percentages of E (curves A, B, C) in addition to the HZS nanocrystals (2% by weight). These radioluminescence experiments on said nanocomposites demonstrate that the sensitisation of E by the HZS (FIG. 5, right hand side) has almost uniform efficiency (curve Q). This results in scintillation performance levels with x-rays which are comparable to those of commercially available scintillators based on individual crystals of bismuth germanate (BGO), as shown in FIG. 6.

Figure 7A:
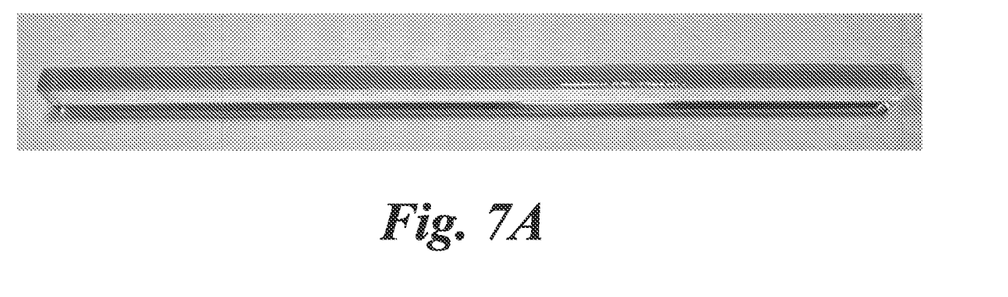
FIGS. 7a and 7b show respectively an SCS prototype in the form of a film deposited on a transparent plastic substrate under ambient lighting and the intensity of radioluminescence emitted by one of the short sides of the same device when subjected to excitation with x-rays at a variable distance from the point of collection, as in the inserted diagram, showing the possibility of obtaining a scintillation signal for long distances of propagation.
Figure 7B:
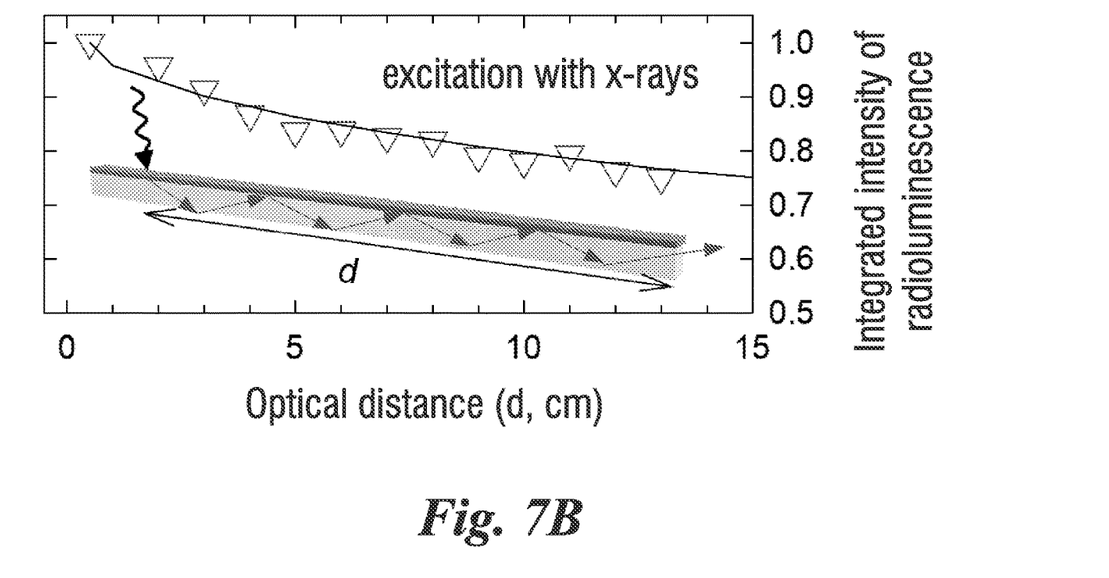

Finally, the measurements carried out of propagation of the light on the SCS confirm that the SCS device based on perovskite nanocubes and E has limited losses of reabsorption or optical diffusion for propagation lengths of tens of centimetres (see FIG. 7b).

In all the forms of the present invention, the SCS can be three-, two- or one-dimensional. The lateral dimensions of an SCS can vary between 10 μm and 300 cm, with thicknesses which vary between 50 nm and 100 cm. FIG. 7a shows a specific solution of an SCS as film 200 deposited on a substrate 201 made of transparent plastic material.

As already described in relation with the FIG. 8, according to a form of the present invention the SCS is coupled optically to other scintillator systems, in order to accelerate the scintillation time thereof, or in general to improve the performance levels thereof.

According to a form of the present invention, at least one of the faces of the SCS is connected to at least one light sensor (e.g. photodiode or photomultiplier).

All the embodiments described in the present document can be combined or used in order to produce devices in a tandem and/or multi-component configuration (FIGS. 8a, 8b), wherein different SCSs are engineered such as to generate scintillation light with a specific wavelength further to interaction with different radiations (ionising and non-ionising). As already described for example, an SCS with an HZS and E optimised for the detection of alpha particles by means of emission with a wavelength λ1 is combined with an SCS based on selective elements for the detection of neutrons (for example Li, B, Gd, etc.) by means of emission of scintillation light with a wavelength λ2. Alternatively, the different penetration power of the radiation can be used such as to distinguish the nature thereof, thus creating a multilayer multi-component SCS. This makes it possible to distinguish the two types of radiation simultaneously by spectral selection of the scintillation light by means of the coupling to detectors which are sensitive to the different scintillation wavelengths.

The scintillator can also be in optical fibre form.

Thanks to the invention, the suitability of nanostructures such as HZSs for emitters with a high level of Stokes shift has been demonstrated for producing SCSs which are efficient, rapid, and have minimum losses of the scintillation light through self-absorption.

The invention claimed is:

1. A sensitized composite scintillator comprising:
a body with a matrix made of polymer material or glass, and
a combination of perovskite nanocrystals with exposed surfaces, said perovskite nanocrystals including elements with a high atomic number which act as sensitizers, and light-emitter species, said light-emitter species being sensitized by the perovskite nanocrystals.

2. The sensitized composite scintillator according to claim 1, wherein the perovskite nanocrystals have one of the following compositions:
A) $M^1M^2X_3$, which is optionally doped with heteroatoms, wherein:
$M^1$=Cs or other elements of the group 1A or 1 in the IUPAC nomenclature;
$M^2$=Pb, Sn or other elements in the group IV or 14 in the IUPAC nomenclature; and
X=element of the group $VII_A$ or 17 in the IUPAC nomenclature;

B) $RMX_3$, which is optionally doped with heteroatoms, wherein:
   $R=[CH_3NH_3]^+$, $[CH(NH_2)_2]^+$, $[CH_6N_3]^+$ or other variously constituted organic molecules;
   M=Pb, Sn or other elements of the group IV or 14 in the IUPAC nomenclature; and
   X=element of the group VIIA or 17 in the IUPAC nomenclature;

C) $M^1{}_2M^2X_6$, which is optionally doped with heteroatoms, wherein:
   $M^1$=Cs or other elements of the group 1A or 1 in the IUPAC nomenclature;
   $M^2$=element of the group IV or 14 in the IUPAC nomenclature; and
   X=element of the group $VII_A$ or 17 in the IUPAC nomenclature;

D) $M^1{}_3M^2{}_2X_9$ or $R_3M^2{}_2X_9$, which is optionally doped with heteroatoms, wherein:
   $M^1$=Cs or other elements of the group 1A or 1 in the IUPAC nomenclature;
   $R=[CH_3NH_3]^+$, $[CH(NH_2)_2]^+$, $[CH_6N_3]^+$ or other variously constituted organic molecules;
   $M_2$=Bi or another element of the group $V_A$ or 15 in the IUPAC nomenclature; and
   X=element of the group VIIA or 17 in the IUPAC nomenclature;

E) Double perovskites with the general composition $M^1{}_2M^2M^3X_6$, which is optionally doped with heteroatoms, wherein:
   M1=element of the group IA or 1 in the IUPAC nomenclature;
   $M^2$=elements of the group IB or 11 in the IUPAC nomenclature or of the group IIIA or 13 in the IUPAC nomenclature;
   $M^3$=element of the group $V_A$ or 15 in the IUPAC nomenclature; and
   X=element of the group $VII_A$ or 17 in the IUPAC nomenclature;

F) Double perovskite compositions with the general composition $M^1{}_2M^2M^3X_{6'}$, which is optionally doped with heteroatoms wherein:
   $M^1$=element of the group IA or 1 in the IUPAC nomenclature;
   $M^2$=monovalent cations of elements or chemical species;
   $M^3$=trivalent cations of elements or chemical species; and
   X=element of the group VIIA or 17 in the IUPAC nomenclature;

G) $M^1M^3X6$, which is optionally doped with heteroatoms, wherein:
   $M^1$=element of the group IA or 1 in the IUPAC nomenclature;
   $M^3$=trivalent cations of elements or chemical species which are balanced by the presence of ionic vacancies; and
   X=element of the group VIIA or 17 in the IUPAC nomenclature;

H) Perovskites based on chalcogens with the formula $ABX_3$, which is optionally doped with heteroatoms, wherein:
   A=monovalent or divalent cation of elements or chemical species;
   B=trivalent or tetravalent or pentavalent cation of elements or chemical species; and
   X=ion of chalcogen;

I) $A_2M^3M^5X_6$, which doped with heteroatoms, wherein:
   A=divalent cation of elements or chemical species;
   $M^3$=trivalent cation of elements or chemical species;
   $M^5$=pentavalent cation of elements or chemical species; and
   X=ion of an element of the group VI or 16 in the IUPAC nomenclature;

L) $M^1{}_2M^2X_4$, which is optionally doped with heteroatoms, wherein:
   $M^1$=Cs or other elements of the group 1A or 1 in the IUPAC nomenclature;
   $M^2$=divalent cation of elements or other chemical species; and
   X=element of the group $VII_A$ or 17 in the IUPAC nomenclature;

M) $AM_2M^2X_4$, which is optionally doped with heteroatoms, wherein:
   A=monovalent cation of elements or chemical species of the group 1 in the IUPAC nomenclature;
   M=monovalent cation of elements or chemical species of the group 1 in the IUPAC nomenclature different from A;
   $M^2$=pentavalent cation of elements or chemical species; and
   X=ion of an element of the group VI or 16 in the IUPAC nomenclature.

3. The sensitized composite scintillator according to claim 1, wherein the perovskite nanocrystals are alternatively in the form of nanocubes, nanospheres, nanothreads and nanoleaves.

4. The sensitized composite scintillator according to claim 1, wherein the perovskite nanocrystals are coupled to metal clusters of elements selected from the group consisting of: gold, silver, nickel, platinum, palladium, copper, aluminium, iron and corresponding alloys.

5. The sensitized composite scintillator according to claim 1, wherein the perovskite nanocrystals have dimensions of between 1 nm and 100 nm.

6. The sensitized composite scintillator according to claim 1, wherein the perovskite nanocrystals constitute from 0.0001% to 95% by weight of the body of the scintillator.

7. The sensitized composite scintillator according to claim 1, wherein the emitters E are nanoparticles of semiconductors, alternatively:
   of the group II-VI,
   of the group III-V,
   of the group IV,
doped and not doped with heteroatoms and respective alloys and heterostructures.

8. The sensitized composite scintillator according to claim 1, wherein the emitters E are clusters of metals comprising gold, silver, nickel, platinum, palladium, copper, aluminium, iron and corresponding alloys.

9. The sensitized composite scintillator according to claim 1, wherein the emitters E are nanoparticles of inorganic or hybrid organic-inorganic perovskites.

10. The sensitized composite scintillator according to claim 1, wherein the emitters E are conjugated organic molecules.

11. The sensitized composite scintillator according to claim 1, wherein the emitters E are conjugated polymers.

12. The sensitized composite scintillator according to claim 1, wherein the emitters E are supramolecular assemblies of organic or inorganic molecules.

13. The sensitized composite scintillator according to claim 1, wherein the emitters E are organometallic complexes.

14. The sensitized composite scintillator according to claim 1, wherein the perovskite nanocrystals and the emitters constitute from 0.0001% to 95% by weight of the body of the sensitized composite scintillator.

15. The sensitized composite scintillator according to claim 1, wherein the positions of the perovskite nanocrystals and the emitters are distributed in a controlled manner, with a level ranging from 0% to 100%.

16. The sensitized composite scintillator according to claim 1, wherein the orientations of the perovskite nanocrystals and the emitters are distributed in a controlled manner, with a level ranging from 0% to 100%.

17. The sensitized composite scintillator according to claim 1, wherein the matrix comprises at least one of the following polymers or respective copolymers: polyacrylates and polymethylmethacrylates, polyolefins, polyvinyls, epoxide resins, polycarbonates, polyacetates, polyamides, polyurethanes, polyketones, polyesters, polycyanoacrylates, silicones, polyglycols, polyimides, fluorinated polymers, polycellulose and derivatives, polyoxazine, and glasses based on silica.

18. The sensitized composite scintillator according to claim 1, wherein the perovskite nanocrystals and the emitters are alternatively dispersed inside a plastic or vitreous matrix based on silica, or deposited in the form of a film on the surfaces thereof.

19. The sensitized composite scintillator according to claim 1, wherein the sensitized composite scintillator is coupled optically to other scintillator systems, in order to accelerate the scintillation time thereof, or improve the performance levels thereof.

20. The sensitized composite scintillator according to claim 1, wherein the composite scintillator is in the form of optical fibre.

21. The sensitized composite scintillator according to claim 1, wherein the composite scintillator is a component of multi-component scintillator devices which are also constituted by different materials.

22. The sensitized composite scintillator according to claim 1, wherein it is three-, two- or one-dimensional.

23. The sensitized composite scintillator according to claim 1, wherein it has lateral dimensions of between 10 μm and 300 cm.

24. The sensitized composite scintillator according to claim 1, wherein it has a thickness of between 50 nm and 100 cm.

25. The sensitized composite scintillator according to claim 1, wherein at least one of the faces of the sensitized composite scintillator is connected to at least one sensor.

26. The sensitized composite scintillator according to claim 1, wherein it is coupled, in a tandem and/or multi-component configuration, to at least one other scintillator, each scintillator generating scintillation light with a specific wavelength further to interaction with different radiations, the assembly of scintillators defining a multi-component scintillator device.

27. The sensitized composite scintillator according to claim 26, wherein it is coupled to another scintillator, to optionally define a body of the multi-component device composed of two sensitized composite scintillators in a multi-layer configuration, for detection of radiation with a different penetration power.

* * * * *